Witnesses
Geo. C. Jepson
Walter Chisin

Inventor
Edward T. Peterson
by Steell Jackson and Soul
Attorneys.

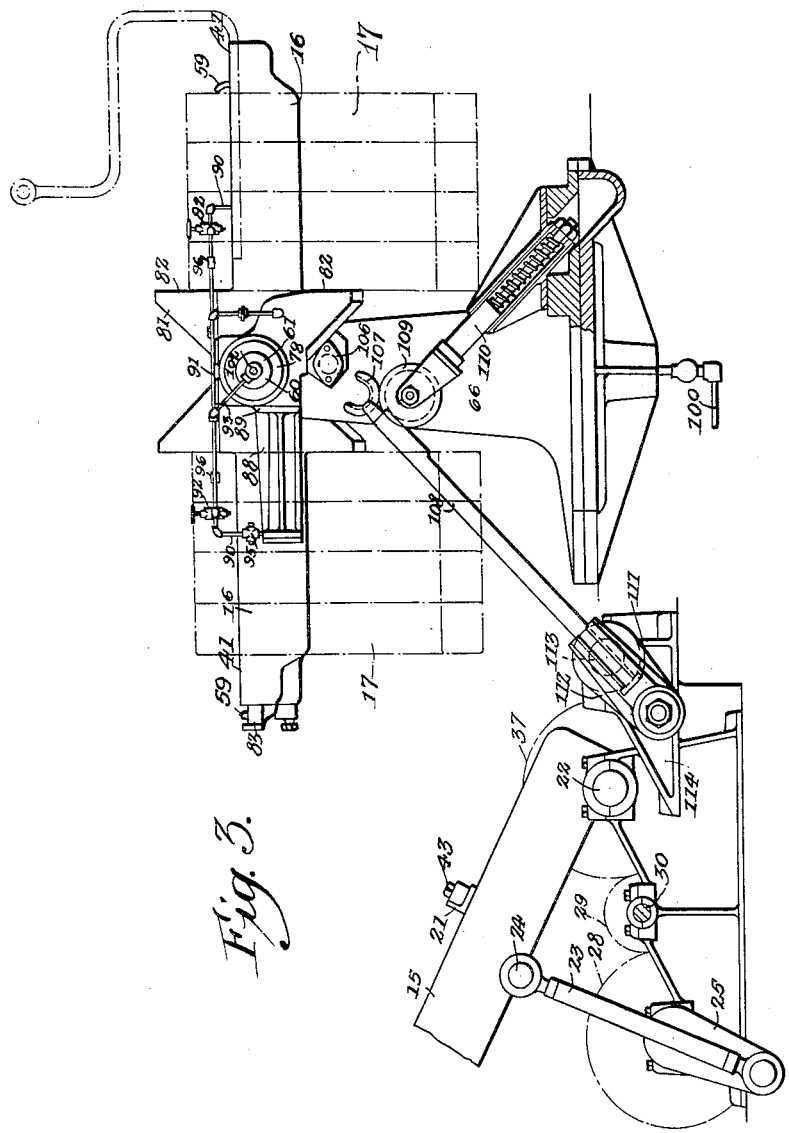

Nov. 7, 1933.  E. T. PETERSON  1,934,325
BUNDLE LOADING DEVICE
Filed Nov. 5, 1931   10 Sheets-Sheet 4
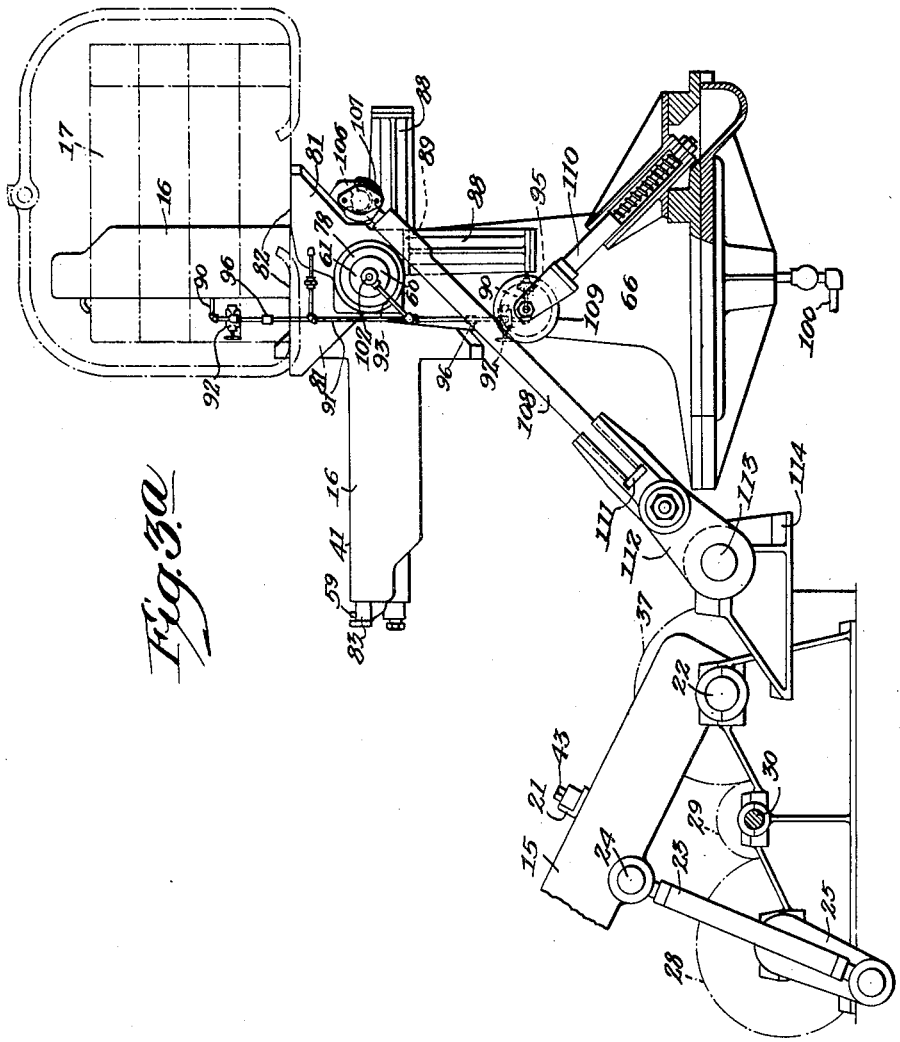
Witnesses:
Geo. E. Jepson
Walter Chism
Inventor.
Edward T. Peterson
by
Attorneys.

Nov. 7, 1933.    E. T. PETERSON    1,934,325
BUNDLE LOADING DEVICE
Filed Nov. 5, 1931    10 Sheets-Sheet 5
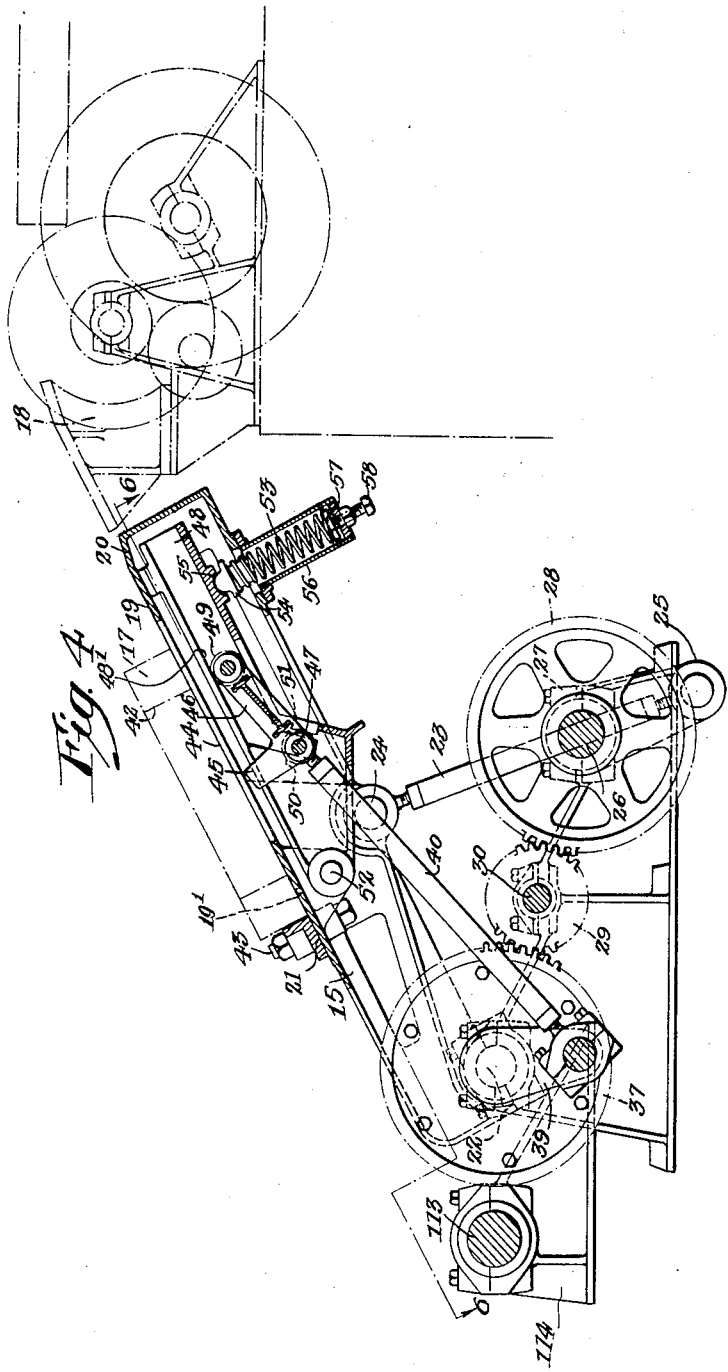
Witnesses:
Geo. C. Jepson
Walter Chism
Inventor
Edward T. Peterson
by Steell ...
Attorneys.

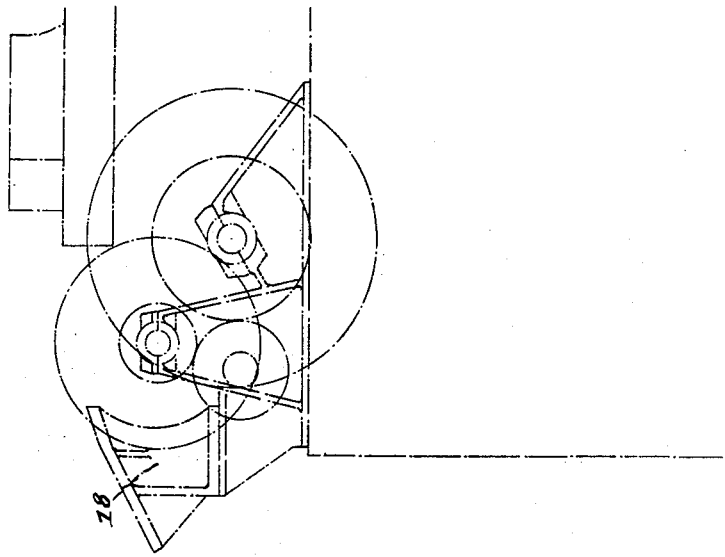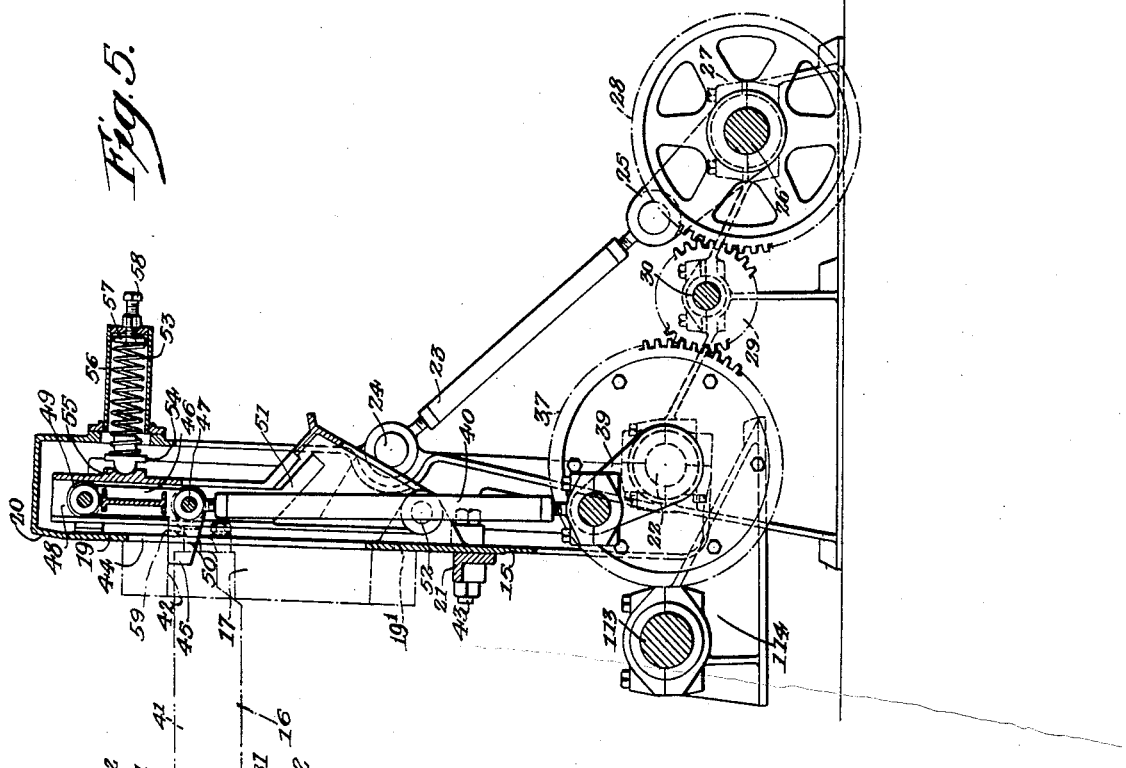

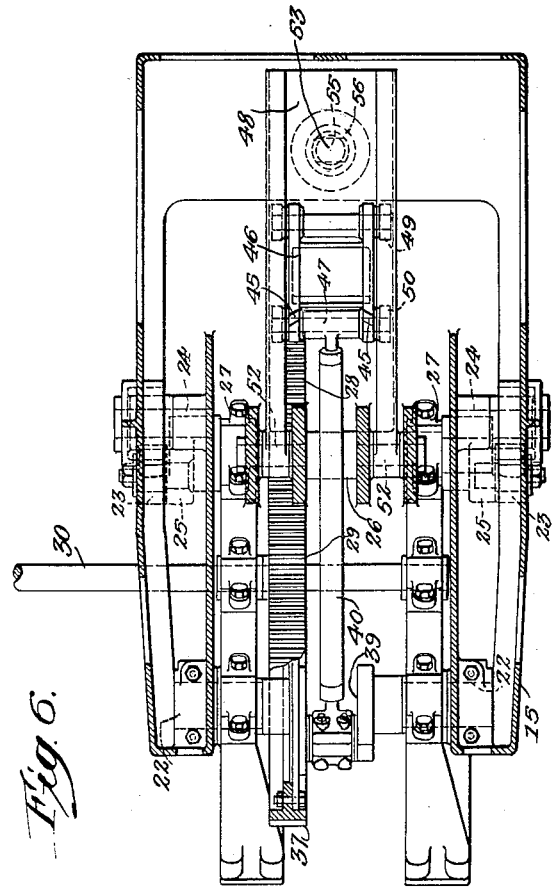

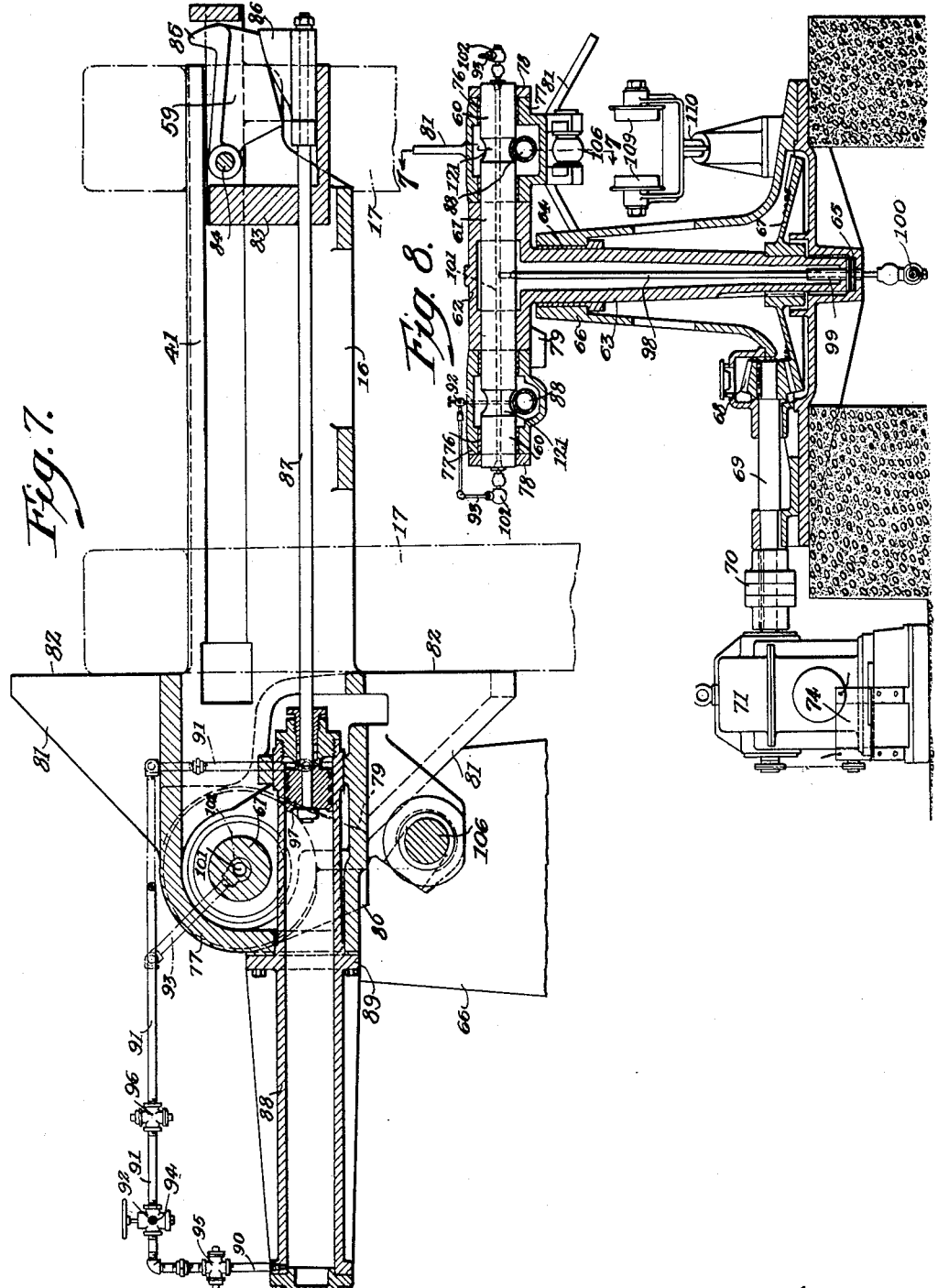

Nov. 7, 1933.　　　　E. T. PETERSON　　　　1,934,325
BUNDLE LOADING DEVICE
Filed Nov. 5, 1931　　　10 Sheets-Sheet 9
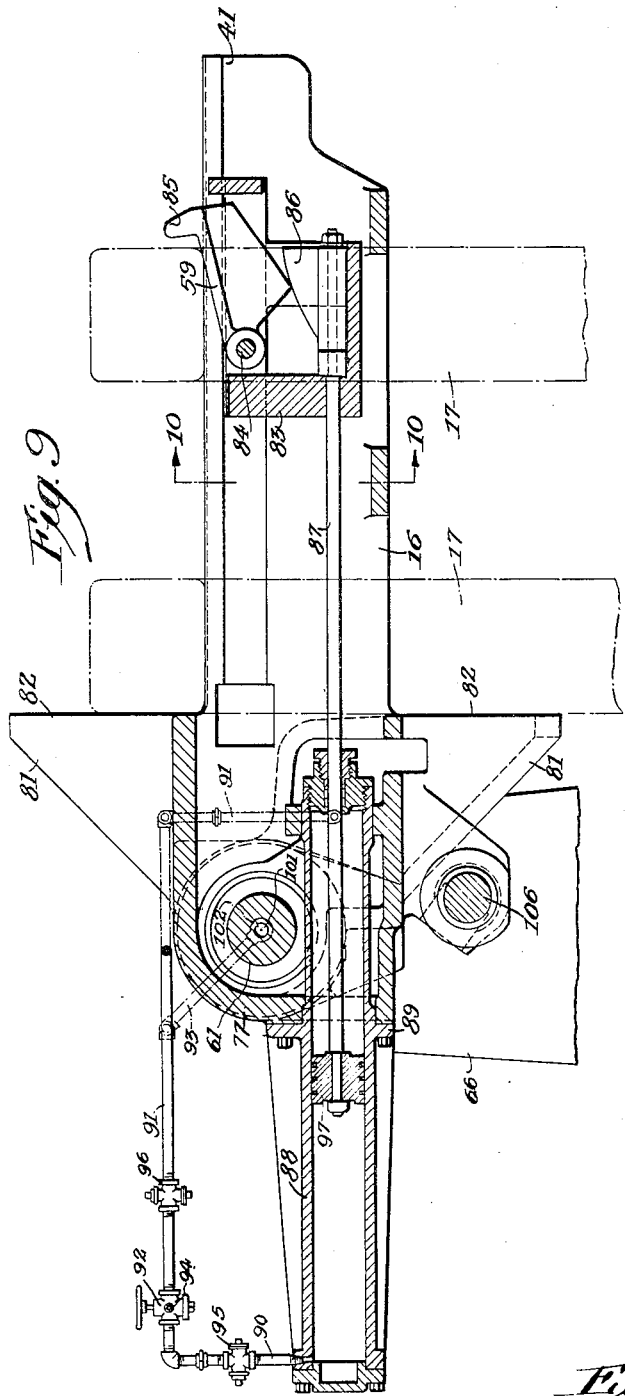
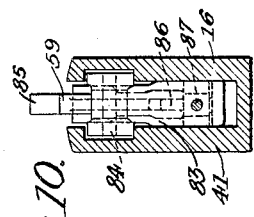
Witnesses:
Inventor:
Edward T. Peterson
by
Attorneys

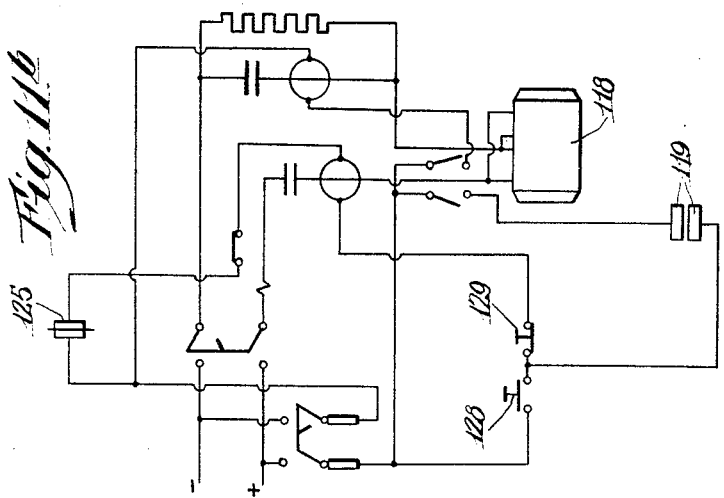
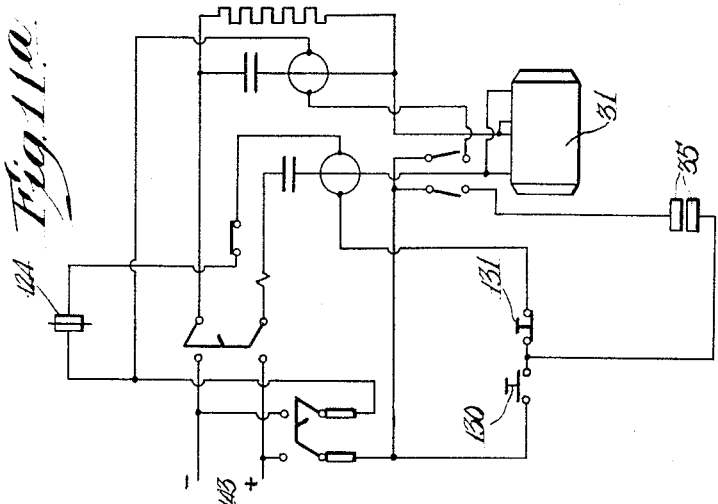
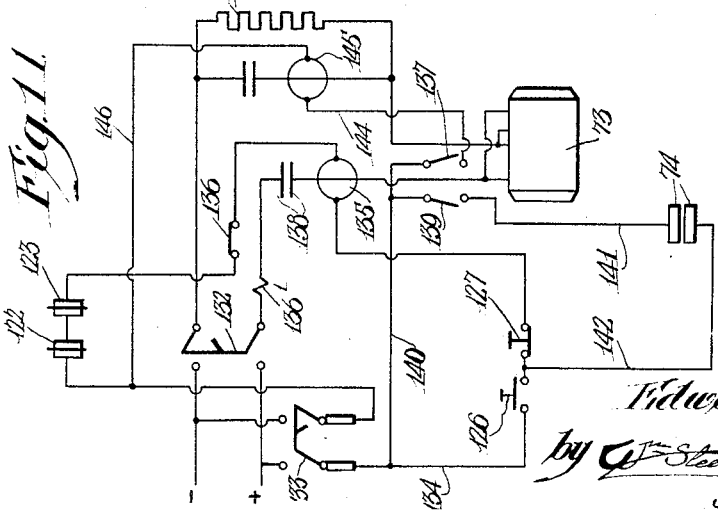

Patented Nov. 7, 1933

1,934,325

UNITED STATES PATENT OFFICE 1,934,325

BUNDLE LOADING DEVICE

Edward T. Peterson, Reading, Pa., assignor to Birdsboro Steel Foundry and Machine Company, Birdsboro, Pa., a corporation of Pennsylvania Application November 5, 1931. Serial No. 573,137

31 Claims. (Cl. 214—1)

My invention relates to rolling mills with particular reference to mechanism for handling made-up coils or bundles after they leave the roll conveyor and for selectively different methods of handling subsequent to delivery from mechanism embodying the present invention.

A purpose of the invention is to provide inexpensive means for delivering bundles of the character indicated of optionally variant dimensions and form from a mill conveyor to optionally different types of transfer mechanism and that will be easy and inexpensive to manufacture and well suited to the needs of service.

A further purpose is to load a plurality of bundles coming one at a time from a mill conveyor one at a time on to a horizontal receiving arm of a bundle carrier and to use the carrier for the easy transfer of the bundles to a truck, overhead crane or the like in load lots.

A further purpose is to provide efficient mechanism for mounting a succession of bundles from a rolling mill conveyor upon a horizontal arm for subsequent presentation by the arm to transfer mechanism, with the arm selectively horizontal or vertical at the time of presentation, according to the character or needs of the transfer mechanism.

A further purpose is to receive bundles of the character indicated from the delivery end of a mill conveyor on to a bed sloping downwardly from the conveyor end and to up-end the bed during times intermediate the receipt of successive bundles from the conveyor in order to effect a transfer of the bundles one at a time to mechanism for presenting successive loads of bundles to one or more other transfer mechanisms such as a truck or overhead crane.

A further purpose is to use a transverse stop across a transfer bed to register bundles of the character indicated with respect to the bed and to use lifter mechanism carried by the bed and operated simultaneously with an up-ending of the bed, to register the interiors of the bundles with respect to a carrier arm receiving the bundles from the bed.

A further purpose is to operate mechanism for up-ending the bed and for registering the bundle with respect to a carrier arm simultaneously by a common shaft.

A further purpose is to first slide upwardly and then partially downwardly a bundle of the character indicated during an up-ending movement of a successively up-ending and downwardly retracting bed momentarily carrying the bundle in order to deposit the bundle on to a carrier arm while the bed is still raised.

A further purpose is to mount duplicate arms upon opposite sides of an intermittently movable turn post, either arm occupying loading and unloading positions during successive rest periods of the turn post with the other arm occupying unloading and loading positions, and during each rest period reloading one arm with bundles one at a time and unloading the other preferably its whole load at once.

A further purpose is to mount a horizontal shaft upon a vertical turn post, and horizontal carrier arms pivotally mounted upon opposite ends of the shaft providing angularly locking connections between the post and arms to support them from moving downward from the horizontal and means for up-ending either arm at an unloading position thereof.

A further purpose is to provide for independence of action between the duplicate arms of a turn post mechanism, each arm being adapted in one position of the post to receive a succession of bundles and in another position of the post to selectively stand horizontally or vertically.

A further purpose is to mount inwardly operating drag mechanism upon the individual arms of a turn post carrier for bundles of the character indicated operating the mechanism to move bundles delivered to the outer end of the arm inwardly along the arm as received.

A further purpose is to operate drag mechanism upon individual arms of a turn post conveyor of the type indicated by fluid means, preferably pneumatically and with fluid connections along the axis of the post and along a pivotal axis of the arms.

A further purpose is to provide electrical means for preventing interfering movements between a turn post of the character indicated and mechanism for up-ending one of the arms thereof, and between the turn post and mechanism for loading the successive arms thereof with bundles.

Further purposes will appear in the specification and in the claims.

I have elected to show one only of the many forms of my invention, selecting a form however that is practical and efficient in operation and which well illustrates the principles involved.

Figure 3 is rear elevation corresponding to a vertical section taken upon the line 3—3 of Figure 1.

Figure 3a is a view corresponding to Figure 3 but with the carrier mechanism in a different position from that of Figure 3, the carrier arm at unloading position being horizontal for horizontal unloading in Figure 3 and vertical for vertical unloading in Figure 3a.

Figure 4 is an enlarged vertical section taken upon the line 4—4 of Figure 1.

Figure 5 is a view corresponding to Figure 4 except that the parts are shown in a different position.

Figure 6 is a sectional plan taken upon the line 6—6 of Figure 4.

Figure 7 is an enlarged section taken upon the line 7—7 of Figure 1, or 7—7 of Figure 8.

Figure 8 is a vertical section taken upon the line 8—8 of Figure 1 at somewhat enlarged scale as compared to Figure 1 but reduced scale as compared with that of Figure 7.

Figure 9 is a view similar to Figure 7 but with the parts in a different position.

Figure 10 is a transverse section of Figure 9 taken upon the line 10—10 thereof.

Figures 11, 11a and 11b are diagrams showing interrelated electrical connections of the motor circuits.

Like numerals refer to like parts in all figures.

Figure 1:
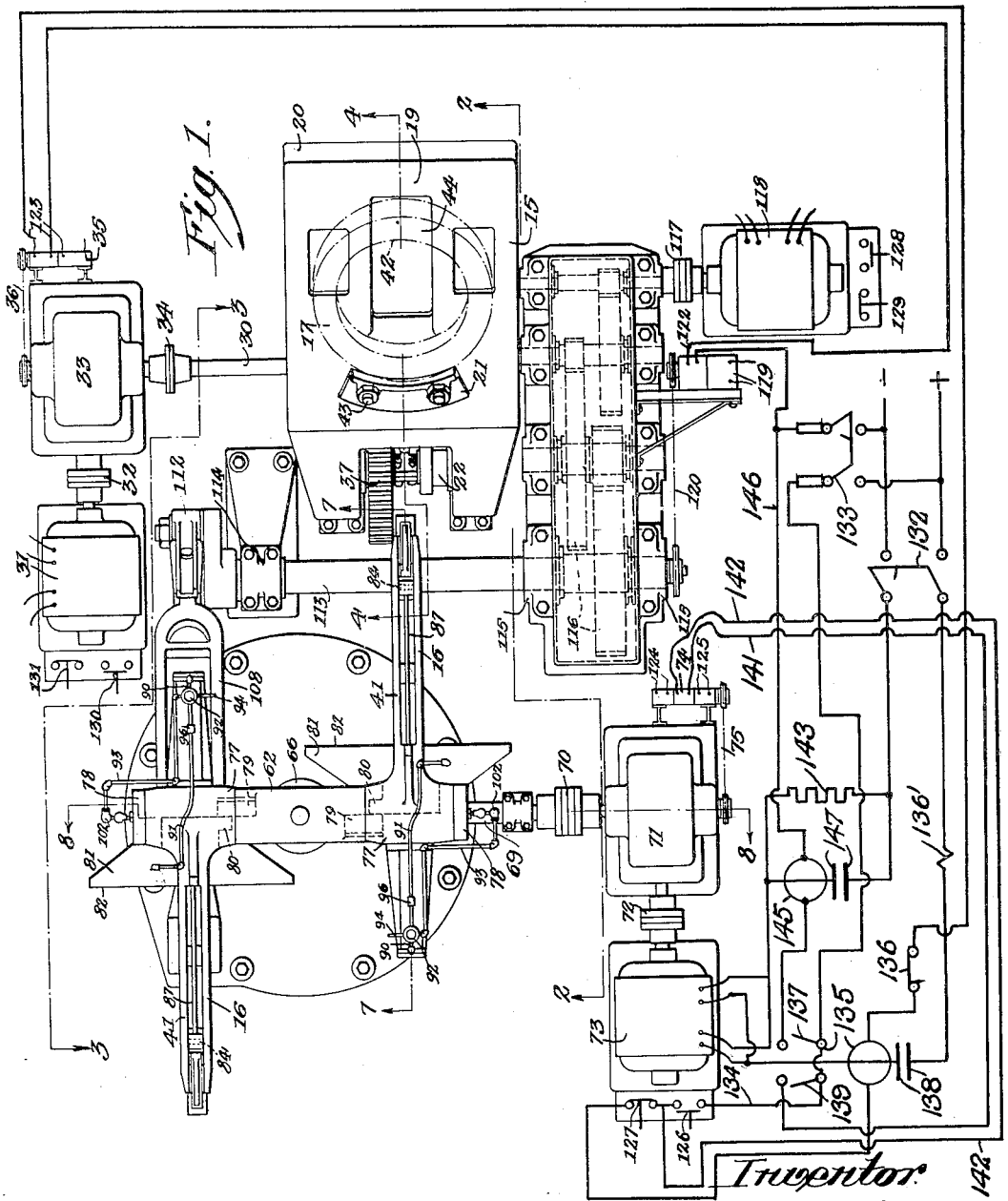
Figure 1 is a top plan view illustrating mechanism embodying a desirable form of my invention, the view including a diagrammatic showing of one of preferably three suitable interrelated electric circuits.

Describing in illustration and not in limitation and referring to the drawings:—

The present invention is directed to mechanism for the intermediate handling of bundles from rolling mills, the illustrated embodiment of the invention being adapted to operate upon bundles of diverse types and sizes from mills of optionally different sizes, for example on diverse bundles from mills of different sizes.

While the bundles have been illustrated conventionally by dot-and-dash rings of rectangular section, it should be understood they may vary quite considerably as to size and form of bundle, the conventional illustration being intended for any bundle adapted to be handled by the illustrated mechanism.

The bundles are usually made up from rolled flats, rounds or the like from the mills preparatory to delivery to mechanism of the present invention.

Bundles of different types or of the same type frequently need to be piled or handled in selectively different ways to better accommodate variant circumstances with respect to later treatment of the bundles and the present equipment delivers selectively to a truck or overhead crane, presenting its load of bundles in the one case on a horizontal arm and in the other case upon the same arm substantially vertical.

Broadly the equipment includes a loader 15 at the delivery end of a rolling mill conveyor and a carrier 16 which presents its loads of bundles for easy transfer to a truck, crane or the like.

The loader receives the bundles 17 one at a time from the mill conveyor 18 and delivers them as received one at a time to the carrier which, after it has received from the loader a plurality of bundles constituting a load, delivers its load to a position for easy transfer to a truck or easy pick-up by an overhead crane.

As best seen in Figures 1 to 5 the loader 15 includes a bed 19 suitably of cast metal and mechanism for variantly positioning the bed with respect to slope.

In its receiving position the bed 19 has a top surface registering at its upper end with the delivery end 20 of the mill conveyor, the top of the bed sloping downwardly so that the bundles may be slid from the conveyor to position against a transverse abutment 21 across the bed.

The abutment 21 should be adjustable in some way or other to accommodate different sizes of bundles. This does not mean necessarily that the abutment itself need be movable though the upper face of the bed may be slotted at 19' for this purpose if desired. The simplest way of adjustment of this is by use of distance pieces above the abutment.

The bed is pivotally supported at its lower end by a shaft 22 and angularly positioned with respect to the shaft by a connecting rod 23.

The upper end of the connecting rod 23 makes pivot connection at 24 to the bottom of the bed at an intermediate point thereof, and makes pivot connection at its lower end to a crank 25 on a horizontal shaft 26 which is journalled in suitable bearings 27 and operated by a gear 28 rigidly fastened to the shaft and meshing with a pinion 29 upon a horizontal shaft 30 adapted to be rotated by a motor 31 through a coupling 32, speed reduction gearing 33 and coupling connection 34.

The circuit of the motor desirably includes a limit switch 35 operatively connected to the reduction gearing at 36 to stop rotation of the shaft at the end of each cycle of movement.

The pinion 29 meshes with a gear 37 that is suitably mounted upon and fastened to the shaft 22 that pivots the bed.

As illustrated the shaft 22 operatively connected by the gear 37 to the pinion 29 carries a crank 39, (Figure 4) which operates a connecting rod 40 for lifting the bundles one at a time as the bed is moved over toward the carrier 16 so that the upper interior of each bundle shall be above the carrier 16 permitting the bundle to be threaded on the end of the carrier.

The lifting or upward sliding of the bundle along the bed takes place during the up-ending of the bed for discharge, the bundle being subsequently lowered into engagement with the arm 41.

While the stop 21 on the bed definitely registers the bottoms of the bundles in the same place with respect to the bed irrespective of variant dimensions of the bundles, the engagement surfaces presented subsequently by the bundles to the carrier arm have positions variant with respect to the bed when the bundle dimensions vary.

The engagement surfaces presented by the bundles to the arm 41 are at 42 inside the top portion of the coil and the lifter secures proper registry between this surface and the arm 41 irrespective of dimensional variances of the bundles.

The bundles 17 when delivered from the conveyor 18 come to rest on the bed against the stop 21 bolted at 43 to the upper side of the bed.

The bed is perforated at 44 to pass the hook end 45 of the a lifter member 46 which is pivoted at 47 to the upper end of the rod 40 to registed the bundles with respect to the receiving arm of the carrier 16.

The member 46 is movable along a guideway 48 by the rod 40, the guideway constraining the member to present its hook outwardly beyond the top of the bed except when the member is at the low portion of the guideway, as in Figure 4 when the hook end is retracted below the top of the bed.

As illustrated the body of the lifter presents rollers at its upper and lower ends to the guideway, the upper rollers 49 moving parallel to the top of the bed and the lower rollers 50 resting upon an inclined portion 51 of the guideway when the lifter is in its low position and in the parallel portion of the guideway to outwardly project the hook as soon as the lifter has been advanced a little distance upwardly along its guideway. This movement is limited by engagement of the rollers 50 against the under surfaces 48' of the guideway with which under surfaces the rolls 49 also engage. Too sudden swinging movement of the hook end 45 is prevented by the weight of the parts causing the hook to move progressively as guided by the wedge-shaped under surface with which the rollers engage from the position in Figure 4 as the lifter member moves toward the right in that figure.

While the guideway member may optionally be a rigid portion of the bed, it is more desirably resiliently yieldable with respect to the bed, and as illustrated it forms a separate member, pivotally connected at its lower end at 52 to the bed and spring pressed to its normal position at its upper end at 53.

It will be seen the guideway member maintains normally a single position with respect to the bed, that shown in Figure 4, but is free to yield downwardly by retracting the spring 53, and thereby greatly lessens danger of sudden stresses and strains upon the operating mechanism. The principal function of the spring 53 is to take up shocks or prevent breakage in the position of Figure 5 in case of the bundle bumping the arm 16.

The compressed spring 53, carries a head 54 at its upper end which bears against the bottom of the guideway in a suitable socket or recess 55 thereof and is adjustably supported at its lower end inside a tubular housing 56 fastened to the bottom of the bed, the lower end of the spring resting against a plate 57 adjustably positioned with respect to the bottom of the housing by a screw 58.

After a bundle 17 has been delivered from the conveyer 18 to the inclined loader then in the position shown in Figure 4, an operator starts the motor 31 by closing a suitable switch.

After this switch is closed the motor continues to operate until the shafts 26 and 22 have each made one complete rotation at which time the limiting switch 35 opens the circuit of the motor, bringing the structure to rest in position to receive the next bundle.

The rotation of the shaft 26 by means of the crank 25 and connecting rod 23 up ends the bed about the shaft 22 from the position shown in Figure 4 to that shown in Figure 5 and then lowers it back to the original position of Figure 4.

During the upward movement of the table, from the position of Figure 4 toward that of Figure 5, the rotation of the shaft 22 operating through the crank 39, rod 40 and lifter 46 moves the lifter upwardly along its guideway. The lower part of the guideway causes the lifter to turn angularly upwardly in clockwise direction in the figures about its upper rollers during the first portion of the movement so as to project the hook end 45 of the lifter into the hollow interior of the bundle. Continued movement of the lifter results in an engagement between the lifter and bundle, raising the bundle from the stop member 21 far enough for the bundle to be carried over and threaded upon the receiving arm 41 of the carrier.

The carrier at this time presents one of its duplicate arms 41 in position to receive the bundle, which thus passes over it and surrounds the arm. Downward retraction of the lifter then deposits the bundle on the extended arm 41 of the carrier near the outer end thereof optionally inwardly of a drag hook 59 (upon the carrier) adapted to resiliently drag the bundle inwardly along the arm 41. More desirably the drag hook 59 remains at an inner position until after the deposition of the bundle on the arm to avoid danger of the hook being bumped by the bundle as it is being deposited on the arm.

When the lifter 46 retracts downwardly along its guideway it first deposits the bundle on to the arm 41 with the hook end 45 projected outwardly into the interior of the bundle; but when the downward movement has progressed far enough to permit the lower rollers of the lifter to pass on to the slope 51 of the guideway the hook end 45 moves out of the interior of the hollow bundle to a position beneath the top surface of the bed.

The cycle of movement of the lifter is suitably advanced as compared to that of the bed and in the illustration this advance corresponds to about sixty degrees at the operating shafts 22 and 26 respectively, each shaft making one rotation during each rotation of the other.

The result of this advance is that the lifter reaches the upper end of its travel along its guideway and begins to retract downwardly before the bed reaches its high position, the lifter depositing the bundle upon the arm 41 of the carrier before the bed begins to recede, and even pulling in its hook end while the bed is still close to its high position.

During the downward retraction of the bed the lifter reaches and passes its lowest position along its guideway and when the bed reaches the position shown in Figure 4, the lifter while still retracted with respect to its hook end below the top surface of the bed has moved somewhat upwardly along its guideway.

Preferably the motor 31 is cut out of circuit by the limit switch 35 in a manner bringing the bed to rest each time it comes to its low position of Figure 4, each starting of the motor at a suitable push button sending the bed and lifter through their individual cycles, that of the bed beginning and stopping at the low position of the bed and that of the lifter beginning and stopping at a point suitably beyond the low point of the lifter.

The carrier 16, Figures 1 to 3 and 6 to 9, includes horizontal duplicate arms 41 pivotally mounted on the projecting ends 60 of a horizontal shaft 61 rigidly mounted in the T head 62 of a hollow turn post 63.

The turn post is rotatably mounted in vertical upper and lower bearings 64 and 65 carried by a suitable housing 66, and is intermittently rotated through 180° by gears 67 and 68, shaft 69, coupling 70, reduction gearing 71, coupling 72 and motor 73. A limiting switch 74 is operatively connected at 75 to the gearing 71. It is set to open the motor circuit and thus to stop the rotation of the turn post when the post has turned 180° and correspondingly shift the relative positions of the arms 41. One arm is presented by the turn post in position to receive bundles one after the other from the loader while the other is presented 180° away in its delivery position for removal in bulk of the bundles placed on it one at a time.

Optionally either arm when in the delivery position, may be up ended about its shaft support 60, being then moved from a horizontal to a substantially vertical position in that delivery of its load of bundles may be sometimes more convenient with the loaded arm horizontal and sometimes more convenient with it substantially vertical.

Always one arm during each rest position of the carrier is in receiving position while the other arm is 180° therefrom in a delivery position.

Each arm, when in its receiving position, is in position to receive bundles one at a time from the loader and when in its delivery position presents its load of bundles for removal during the reloading of the other arm at receiving position. The arm at unloading position may extend either horizontally or vertically according to circumstance.

As the carrier during each period of rest may receive a number of bundles which are threaded upon it one at a time while the loader operates upon one bundle at a time, the mechanism for shifting the angular positions of the arms is desirably independent of the mechanism for operating the loader further than to provide interlocking connections whereby the loader may not be operated unless the carrier is presenting one of its arms in position to receive the bundle from the loader.

Each arm 41 is provided with a vertical interlock with the T head of the turn post to prevent the arm from swinging downwardly beyond the horizontal during loading and during the shifting movement of the turn post, and also includes auxiliary loading mechanism for pulling the bundles one at a time inwardly along the receiving arm, rendered desirable because the bundles are delivered to the arm at its outer end.

Each arm is also formed for easy cooperation with up ending mechanism operative upon the arm at the discharge position if the arm is to deliver vertically, as to an overhead crane or the like.

The pivot ends 60 of the shaft 61, journals for the arms 41, are in effect rigid portions of the turn post, the hub portions 77 of the arms 41 presenting suitable sleeve bearings 76 to the shaft ends 60.

As each arm is a duplicate of the other, a description of one will suffice. Each pivots at its inner end upon a pivot projection 60 from the shaft 61, is prevented from longitudinal movement outwardly along the shaft by a suitable collar 78 fastened to the shaft at its outer end, and is prevented from moving downwardly beyond the horizontal by the engagement of cooperating lugs 79 and 80 respectively on the head of the turn post and on the arm, (Fig. 7).

The arm, suitably of cast metal includes angularly spaced web abutments 81, desirably three, with cooperating edges 82 perpendicular to the arm near the pivot end thereof directed toward the receiving end of the arm and limiting inward movement of bundles along the arm.

The arm also houses and guides mechanism for dragging the successive bundles inwardly as received from the loader so as to properly load the arm along its full length before shifting the turn post.

Outwardly from the abutting edges 82 of the web extensions the arm includes a guideway for a slide 83 carrying the drag hook 59. The drag hook is horizontally pivoted at 84 to opposite vertical walls of the slide and presents its hook portion 85 above or below the upper surface of the arm according to the position of a wedge 86 also carried by the slide, but with a limited longitudinal range of movement with respect to the slide.

The wedge 86 presents its wedge surface upwardly against the bottom of the drag hook at parts thereof outwardly of the pivot 84 and determines the upward projection of the drag hook by the longitudinal position of the wedge with respect to the slide.

The slide 83 is adapted to be slid longitudinally along the arm by a rod 87 suitably operated pneumatically by means of an air cylinder 88 which is fastened to the arm at an intermediate flange 89 (Figure 7) and extends somewhat forwardly under the horizontal pivot portion 60 of the turn post and rearwardly from the inner end of the arm to provide the requisite range of longitudinal movement to the rod 87.

Air connections to forward and rearward ends of the cylinder 88 are through pipes 90 and 91 respectively which connect to a fourway valve 92 supplied with air pressure through a connection 93 and discharging to waste at 94.

The fourway valve is suitably operated manually, connecting either end of the cylinder to pressure and the other to discharge in the usual way.

Desirably valves 95 and 96 are inserted in the connections 90 and 91 permitting the cylinder to be pneumatically locked at any position of its plunger 97.

Air pressure to the pipe 93 feeding the fourway valve is suitably provided along the vertical axis of the turn posts, as along a pipe 98 having a stuffing box connection at 99 with a stationary supply pipe 100, (Fig. 8).

The pipe 98 connects at its upper end into a longitudinal bore 101 of the shaft 61 from which swivel connection is made at 102 to the pipe 93 going to the fourway valve.

The slide has in effect a lost motion connection with the piston rod 87 and rigid connection with the wedge 86 so that longitudinal movement of the rod inwardly first moves the drag hook outwardly and then moves the slide and therefore the drag hook bodily inwardly along the arm and when the piston 97 and its rod 87 move outwardly, the wedge moves in the slide to its outer position with respect to the slide before the slide begins to move so that the wedge hook is retracted downwardly beneath the top of the arm whenever it is carried outwardly along the arm and projected along upwardly above the top of the arm whenever it is carried inwardly along the arm.

It will be seen pneumatic means has been provided for pressing each new bundle inwardly from the outer end of the arm, with an inward movement until the new bundle is brought to rest by the abutments 82 either by direct engagement or through one or more intermediate bundles already loaded upon the arm.

Normally an operator at the pneumatic control valve 92 uses the drag hook to pull the bundles inwardly as received, one after another as far as they will go, first against the web abutments 82 and then against the preceding bundle until the arm is loaded with bundles.

While unadapted to move downwardly from the horizontal, means is preferably provided adapting each arm to be up-ended on its pivot 61 when it has been shifted, loaded, to its delivery position by the turn post, the up-ending of the loaded arm permitting an overhead crane or the like to more easily pick off the load of bundles.

Figure 2:
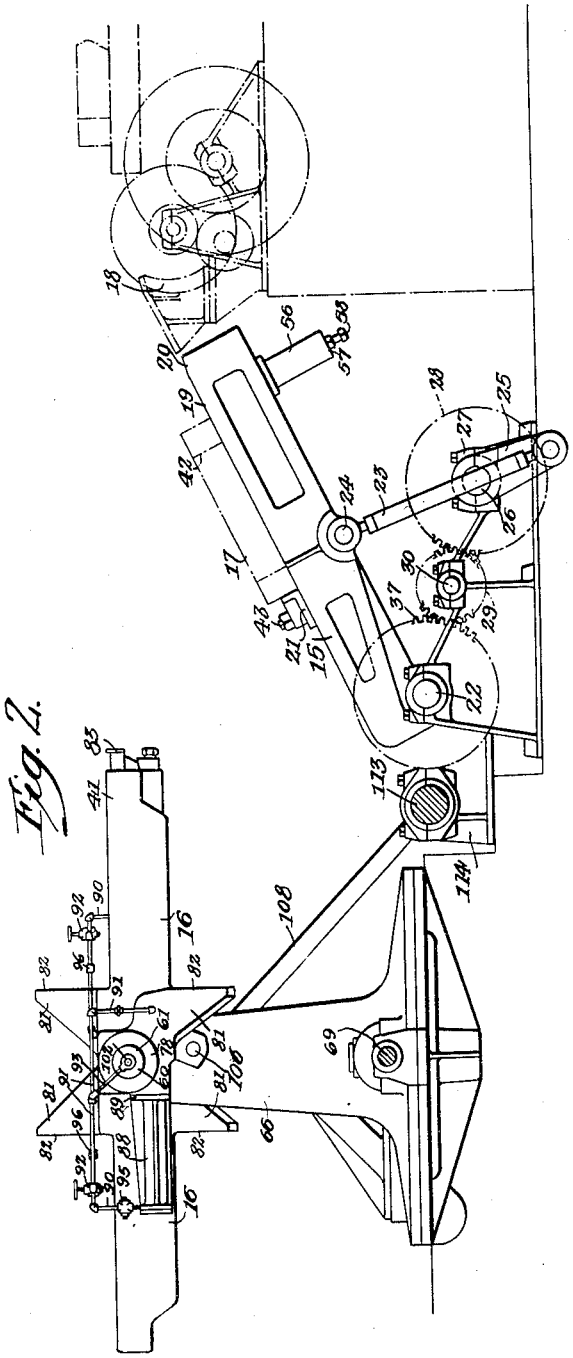
Figure 2 is a vertical section of Figure 1 taken on the line 2—2 thereof.

The means for optionally turning either arm upright when in its delivery position is best seen in Figures 2, 3 and 8.

Each arm carries on its lower side a horizontal pin or lift block 106 in position to be engaged by the forked outer end 107 of a connecting rod 108 operating in a vertical plane at right angles to the shaft 61 in rest positions of the turn post, a vertical plane containing either arm of the carrier when the arm is presented by the turn post in its delivery position.

The upper end of the connecting rod 108 receives a guiding support upon spaced rollers 109 presented by the forked head of a spring plunger 110 that is mounted in the base structure as best seen in Figure 3 and the lower end of the rod 108 journals on the pin 111 of a crank 112 carried by a shaft 113.

The shaft 113 is parallel to the shaft 61 when the turn post is in either of its two positions of rest, is mounted in bearings 114 and 115 and connects through reduction gearing 116 and coupling 117 to a suitable motor 118, the circuit of the motor desirably including a limit switch 119 operatively connected at 120 to the shaft 113 in such a way as to stop the motor automatically when the shaft has made one half turn, leaving the shaft, either in position to hold the arm 41 substantially upright or in retracted position to leave the arm horizontal after having lowered the arm from the vertical to the horizontal and free to clear the upper end of the connecting rod 108.

When it is desired to remove a load of bundles from the arm by an overhead crane or the like, an operator starts the motor 118, as at suitable push button, the shaft 113 then making one half turn to effect an up-ending of the loaded arm.

During this half turn the connecting rod is moved upwardly by the crank and its fork upper end 107 guided resiliently at 109 engages the under side of the arm at the pin or block 106, and continuing to move swings the arm upwardly about its pivot 60 until it comes to rest automatically by the operation of the limit switch when the connecting rod is in position to hold the arm substantially vertically.

The bundles are now lifted away from the loaded arm, as by means of an overhead crane or the like after which the operator again turns on the motor which first lowers the arm to the horizontal and then moves on downwardly out of the way to its initial position at which point it comes to rest automatically by the operation of the limit switch 119.

It will be understood that the arm 41, the pneumatic cylinder, the fourway valve 92 and the pipings from the fourway valve to the ends of the cylinder and to the swivel 102 at the end of the shaft 60 turn as a unit about the shaft 60, which is shown circumferentially grooved at 121 to clear the cylinder.

Preferably connections are such as to make an angular advance of the turn post impossible unless the arm 41 at the discharge position is horizontal, and also impossible unless the loader is retracted to its receiving position.

Also it is desirable to make movement of the bed and movement of the mechanism for turning upright one of the arms 41 of the turn post each impossible except when the turn post is occupying one or other of its normal rest position.

While these interlocking interconnections between the loader, turn post and tilting mechanism can be effected in different suitable ways, I prefer to accomplish it electrically, for example as indicated diagrammatically in Figure 1.

As illustrated in Figure 1 the control circuit of the motor 73 operating the turn post includes a limit switch 74 to stop the motor automatically when the turn post advances to its next position of rest, cooperating contacts 122 mounted adjacent the limit switch 119 and always open unless the shaft 113 is in position to retract the crank 112 to its low position; also cooperating contacts 123 adjacent the limit switch 35 and controlled by the same shaft in a manner to keep the contacts open and therefore the motor 73 on open circuit unless the bed of the loader is in its receiving position.

In the same way the control circuit of the motor 31 includes the limit switch 35 for stopping the movement of the bed each time the bed returns to its receiving position and also includes cooperating contacts 124 adjacent the limit switch 74 and operated by the position of the turn post, contacts 124 being always open unless the turn post is in one of its normal positions of rest and closed when the turn post is not in either position of rest.

In the same way the control circuit of the motor 118 includes not only the limit switch 119 for bringing the shaft 113 to rest at the end of each 180° advance but also includes cooperating contacts 125 in every way similar to the contacts 124, being always open unless the turn post is in one of its normal positions of rest and closed when the turn post is not in either rest position.

The control circuits of the three motors 73, 31 and 118 may desirably also each include a suitable starting button and a suitable stop button, as indicated at 126 and 127 for the circuit of the motor 73, at 128 and 129 for the circuit of the motor 118, and at 130 and 131 for the circuit of the motor 31.

Any of the three motors may be started at its starting button unless its control circuit is open at one of the contacts, 122, 123, 124 or 125 and may if desired be stopped at its stopping switch before it has been brought to rest automatically, by the operation of its limit switch.

It will be understood that the electrical connections may include standard control circuits to be operated automatically or manually and of any suitable kind of which there are already a number on the market.

It will be understood that the limit switches contain or are associated with the usual brakes by which the motion is stopped at the required point.

Suitable electrical connections are shown on Figure 1 for the motor 73 of the turntable and on Figures 11, 11a and 11b for the three motors, 73 of the turntable, 31 of the loader and 118 of the mechanism for up-ending and lowering the carrier arms of the turntable, the connections illustrated in Figure 1 corresponding to those shown in Figure 11.

Referring to the connections shown in Figures 1 and 11, the source of supply for the motor 73 is connected to a main disconnecting knife switch 132 to the main circuit of the motor and through control circuit knife switch 133 to the control circuit, the switches 132 and 133 shown open in the figures being normally closed.

To start the motor the operator presses the starting button 126 which closes the control circuit from one terminal of the switch 133 through the wire 134, starting switch 126, the stop switch 127, the magnetic contactor 135, a normally closed contact 136 of the overload relay, through the contacts 123 which are only open if the loader is in its low position, through the contacts 122 only open if the lifter arm of the turntable is in its low position and thence back to the other terminal of the control switch 133.

The energization of the magnetic contactor 135 closes the accelerator contactor 137, the line contactor 138 and the interlock contactor 139.

Closing the interlock contactor 139 by-passes the starting button through wire 140, interlock contactor 139, wire 141, limit switch 74 and wire 142, so that an operator may release the starting button without affecting the operation of the motor.

The closing of the line contactor 138 closes the motor circuit from one terminal of the main disconnecting switch 132, through the winding 136' of the overload relay, the contactor 138, parallel operating and brake release circuits of the motor 73, a starting resistance 143, thence back to the other terminal of the disconnecting switch.

The closing of the accelerator contactor 137 closes the control circuit from one terminal of the switch 133, through wire 140, contactor 137, wire 144, coil 145 of the accelerating contactor, and wire 146 back to the other terminal of the switch 133. Energizing the coil 145 closes the contactor 147 of the motor circuit to by-pass the starting resistance 143 in the usual way, permitting normal operation of the motor as long as the circuit remains closed at the limit switch 74.

The control circuit opens at the limit switch 74. When this switch opens the coil 135 of the magnetic contactors 138, 137 and 139 de-energizes all these contacts to open, resulting in a shut down of the motor and an application of the spring-operated brake.

The operation of the other motors is exactly the same and therefore need not be described in detail.

It will be understood that the details of the control circuits, as indicated on the wiring diagrams are not in themselves the applicant's invention, being in the present state of the art the result of mere mechanical and electrical skill.

In view of my invention and disclosure variations and moifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention, what I claim as new and desire to secure by Letters patent is:—

1. A bundle loader of the character indicated including a bed to receive successive bundles at one side and having a horizontal pivot support toward the other side, a stop on the bed inwardly from the receiving side, means for delivering the bundles one at a time on to the bed against the stop, means for angularly moving the bed upwardly and then downwardly with respect to the pivot, a receiving arm and mechanism operative during the angular movement of the bed and sliding the bundle with respect to the bed to register the blundle at an interior surface thereof with the carrier arm at an upwardly directed surface on a receiving end thereof while the bed is in a high position.

2. A bundle loader of the character indicated including a bed to receive successive bundles at one side and having a horizontal pivot support toward the other side, means for delivering a bundle on to the bed, means for pivotally raising and lowering the bed, means for sliding the received bundle upwardly and somewhat downwardly during the upward movement of the bed and a receiving arm adapted to be engaged by an interior surface of the bundle during the downward movement thereof and while the bed is raised.

3. A bed, a stop thereon, means for delivering a bundle on to the bed against the stop, a carrier arm having a receiving end high with respect to the bed when the bed is in its receiving position and means for simultaneously upwardly tilting the bed and for sliding the bundle away from its stop and then during the upward tilting toward the stop in order to register an inner portion of the bundle with the carrier arm in a high position of the bed.

4. A bundle loader including a bed having a horizontal pivot support toward one side, receiving successive bundles at the other side and in receiving position sloping upwardly toward its receiving side, an abutment on the bed limiting the downward movement of bundles delivered to the table at its receiving position and mechanism for pivotally swinging the table upwardly to deliver the bundle and then downwardly to its receiving position for another bundle, in combination with carrier mechanism including an arm in the plane of angular tilting movement of the loader and having a receiving end registering with the bundle delivery position from the loader, and mechanism for sliding bundles inwardly along the arm from the receiving end to adapt the arm to receive a plurality of bundles from the loader.

5. A bundle loader of the character indicated including a bed to receive successive bundles at one side and having a horizontal pivot support toward the other side, a stop on the bed inwardly from the receiving side thereof, means for delivering the bundles one at a time on to the bed against the stop, means for angularly moving the bed upwardly and downwardly with respect to the pivot, a receiving arm, mechanism operative during the swinging movement of the bed and sliding the bundle with respect to the bed away from and then toward the stop to register the bundle at an interior surface thereof with the carrier arm at an upwardly directed surface on a receiving end thereof while the bed is in a high position, and mechanism for resiliently pressing a bundle inwardly along the arm from the receiving point thereof to be out of the way of another bundle from the loader.

6. In mechanism of the character indicated, a bundle carrier comprising a turn post, a T head thereon, and horizontal pivot extensions from opposite sides of the head, duplicate arms pivotally mounted upon the head extensions, lug connections between the head and the respective arms adapting the arms to be supported in horizontal positions and mechanism for intermittently shifting the relative positions of the arms by angularly moving the post.

7. In mechanism of the character indicated, a bundle carrier comprising a turn post, a T head thereon, and horizontal pivot extensions from opposite sides of the head, duplicate arms pivotally mounted upon the head extensions, connections adapting the arms to be supported in horizontal positions and mechanism for intermittently shifting the relative positions of the arms by angularly moving the post, the pivotal mounts of the arms permitting the arms to be turned upwardly from the horizontal at one of the positions thereof.

8. In mechanism of the character indicated, a bundle carrier comprising a turn post, a T head thereon, and horizontal extensions from opposite sides of the head, duplicate arms mounted upon the head extensions spaced from one another along the extensions on opposite sides of the post axis and extending in opposite directions laterally from the extensions, connections adapting the arms to be supported in horizontal positions and mechanism for intermittently shifting the relative positions of the arms by angularly moving the post, in combination with a loader operative to load a plurality of bundles on to either arm when in one of the positions of rest thereof.

9. In mechanism of the character indicated, a bundle carrier comprising a turn post, a T head thereon, and horizontal extensions from opposite sides of the head, duplicate arms mounted upon the head extensions, connections between the head and the respective arms adapting the arms to be supported in horizontal positions and mechanism for intermittently shifting the relative positions of the arms by angularly moving the post, in combination with a loader operative to load a plurality of bundles on to either arm when in one of the positions of rest thereof, and means mounted on each arm adapted to resiliently press a bundle loaded on the arm near the outer end thereof inwardly along the arm.

10. In mechanism of the character indicated, a bundle carrier comprising a turn post, a T head thereon, and horizontal extensions from opposite sides of the head, duplicate arms pivotally mounted upon the head extensions, lug connections between the head and the respective arms adapting the arms to be supported in horizontal positions and mechanism for intermittently shifting the relative positions of the arms by angularly moving the post, in combination with a loader operative to load a plurality of bundles on to either arm when in one of the positions of rest thereof, and means mounted on each arm adapted to resiliently press a bundle loaded on the arm near the outer end thereof inwardly along the arm.

11. In mechanism of the character indicated, a bundle carrier comprising a turn post, a T head thereon, and horizontal extensions from opposite sides of the head, duplicate arms mounted upon the head extensions, lug connections between the head and the respective arms adapting the arms to be supported in horizontal positions and mechanism for intermittently shifting the relative positions of the arms by angularly moving the post, in combination with a loader operative to load a plurality of bundles on to either arm when in one of the positions of rest thereof, and one or more abutments on each arm near the pivot support thereof and limiting the inward movement of the bundles along the arm.

12. In mechanism of the character indicated, a bundle carrier comprising a turn post, a T head thereon, and horizontal pivot extensions from opposite sides of the head, duplicate arms pivotally mounted upon the head extensions, lug connections between the head and the respective arms adapting the arms to be supported in horizontal positions and mechanism for intermittently shifting the relative positions of the arms by angularly moving the post, in combination with a loader operative to load a plurality of bundles on to either arm when in one of the positions of rest thereof, and means mounted on each arm adapted to resiliently press a bundle loaded on the arm near the outer end thereof inwardly along the arm and one or more abutments on each arm near the pivot support thereof and limiting the inward movement of the bundles along the arm.

13. In mechanism of the character indicated, a bundle carrier comprising a turn post, a T head thereon, and horizontal pivot extensions from opposite sides of the head, duplicate arms pivotally mounted upon the head extensions, lug connections between the head and the respective arms adapting the arms to be supported in horizontal positions and mechanism for intermittently shifting the relative positions of the arms by angularly moving the post, in combination with mechanism for lifting either arm angularly about its pivot support to near vertical when in one position of rest.

14. In mechanism of the character indicated, a bundle carrier comprising a turn post, a T head thereon, and horizontal pivot extensions from opposite sides of the head, duplicate arms pivotally mounted upon the head extensions, lug connections between the head and the respective arms adapting the arms to be supported in horizontal positions and mechanism for intermittently shifting the relative positions of the arms by angularly moving the post, in combination with mechanism for lifting either arm angularly about its pivot support to near vertical when in one position of rest, said mechanism comprising a downward projection from each arm and a push member adapted to be moved into the projection when the said arm is in its said one position to push the arm upwardly.

15. In mechanism of the character indicated, a bundle carrier comprising a turn post, a T head thereon, and horizontal pivot extensions from opposite sides of the head, duplicate arms pivotally mounted upon the head extensions, lug connections between the head and the respective arms adapting the arms to be supported in horizontal positions and mechanism for intermittently shifting the relative positions of the arms by angularly moving the post, in combination with mechanism for lifting either arm angularly about its pivot support to near vertical when in one position of rest, said mechanism comprising a downward projection from each arm and a push member adapted to be moved longitudinally into the projection when the arm is in its said one position to push the arm upwardly, the push member including a crank and connecting rod, and a resilient guide for the rod adapting it to engage the projection.

16. In mechanism of the character indicated, a bundle carrier comprising a turn post, a T head thereon, and horizontal pivot extensions from opposite sides of the head, duplicate arms pivotally mounted upon the head extensions, lug connections between the head and the respective arms adapting the arms to be supported in horizontal positions and mechanism for intermittently shifting the relative positions of the arms by angularly moving the post, in combination with mechanism for lifting either arm angularly about its pivot support to near vertical when in one position of rest, said mechanism comprising a downward projection from each arm a crank and connecting rod, and a guide for the rod adapting the rod to engage the projection.

17. In mechanism of the character indicated, a bundle carrier comprising a turn post, a T head thereon, and horizontal pivot extensions from opposite sides of the head, duplicate arms pivotally mounted upon the head extensions, lug connections between the head and the respective arms adapting the arms to be supported in horizontal positions and mechanism for intermittently shifting the relative positions of the arms by angularly moving the post, in combination with mechanism for lifting either arm angularly about its pivot support to near vertical when in one position of rest, said mechanism comprising a downward projection from each arm a crank and connecting rod, a guide for the rod adapting the rod to engage the projection, a shaft mounting the crank, a motor, reduction gearing operatively connecting the motor and shaft and a limit switch stopping the motor when the arm has moved to upright position if started from low position, or when the arm has moved to retracted position if started from upper position.

18. In mechanism of the character indicated, a bundle carrier comprising a turn post, a T head thereon, and horizontal pivot extensions from opposite sides of the head, duplicate arms pivotally mounted upon the head extensions, lug connections between the head and the respective arms adapting the arms to be supported in horizontal positions and mechanism for intermittently shifting the relative positions of the arms by angularly moving the post, in combination with mechanism for lifting either arm angularly about its pivot support to near vertical when in one position of rest, said mechanism comprising a downward projection from each arm, a crank and connecting rod, a guide for the rod adapting the rod to engage the projection, a shaft mounting the crank, and means for angularly advancing the shaft by half turn steps to erect either arm from the horizontal position and to subsequently downwardly retract the arm.

19. In mechanism of the character indicated, a carrier arm adapted to receive a plurality of bundles one at a time at an outer end of the arm, drag mechanism for resiliently pulling a received bundle inwardly along the arm and including a fluid cylinder mounted on a rearward portion of the arm, a piston therein, a piston rod extending forwardly from the cylinder, a slide carrying a lug and connections between the slide and rod adapting the rod to move the slide longitudinally along the arm and to project the lug to engage a bundle during the inward movement of the slide and to downwardly retract the lug throughout the outward movement of the slide along the arm.

20. In mechanism of the character indicated, a carrier arm adapted to receive a plurality of bundles one at a time at an outer end of the arm, drag mechanism for resiliently pulling a received bundle inwardly along the arm and including a fluid cylinder mounted on a rearward portion of the arm, a piston therein, a piston rod extending forwardly from the cylinder, a slide positioned longitudinally of the arm by the rod and having a lost motion connection with the rod, a hook longitudinally positioned by the slide and carried by the slide and having an engagement with an outer end of the rod such as to present the hook in position to engage the bundle when the rod is at the inner end of its said range of lost motion and in an inoperative position with respect to the bundle when the rod is at the outer end of its range of lost motion, upwardly projecting the hook during the inward movement of the slide and permitting the hook to retract downwardly during the outward movement of the slide.

21. In mechanism of the character indicated, a carrier arm adapted to receive a plurality of bundles one at a time at an outer end of the arm, drag mechanism for resiliently pulling a received bundle inwardly along the arm and including a fluid cylinder mounted on a rearward portion of the arm, a piston therein, a piston rod extending forwardly from the cylinder, a slide positioned longitudinally of the arm by the rod and having a lost motion connection with the rod, a hook adapted to present its hook end above the arm and wedge connection between the outer end of the rod and hook adapting the rod to raise the hook into operative position when moved inwardly to inwardly move the slide and to permit downward retraction of the hook when moved outwardly of the arm.

22. In mechanism of the character indicated, two transfer members including a loader having receiving and discharge positions and a turn post carrying duplicate arms alternately presented to the loader in successive rest positions of the post in combination with mechanism for preventing advancing movement of one of the members unless the other is in a normal receiving position.

23. In mechanism of the character indicated, two transfer members including a loader having receiving and discharge positions and a turn post carrying duplicate arms alternately presented to the loader in successive rest positions of the post in combination with a motor operatively connected to one of the members and a control circuit thereof including a pair of contacts relatively positioned by the other member and closed when the said other member is in a normal receiving position and open when the said other member is out of its receiving position.

24. In mechanism of the character indicated, a turn post having duplicate arms, one in receiving position and the other in delivery position, said arms being normally horizontal, mechanism for advancing the post to shift the relative positions of the arms, other mechanism for lifting either arm when in its delivery position of rest and means for preventing movement of either mechanism unless the other is in its normal position of rest.

25. In mechanism of the character indicated, a turn post having duplicate arms, one in receiving position and the other in delivery position, said arms being normally horizontal, mechanism for advancing the post to shift the relative positions of the arms, other mechanism for lifting either arm when in its delivery position of rest, a motor operatively connected to one of the mechanisms and a control circuit thereof including a pair of contacts relatively positioned by the other mechanism and closed when the said other mechanism is positioning its operated post or arm in receiving position and open at other positions thereof.

26. In mechanism of the character indicated, a turn post having duplicate arms, one in receiving position and the other in delivery position, said arms being normally horizontal, a loader in position to load either arm at the loading position thereof, mechanism for angularly erecting either arm in its delivery position and means for preventing the rotation of the turn post when the loader is not in normal position of rest and for preventing rotation of the turn post when the erecting mechanism is not in its retracted position of rest.

27. In mechanism of the character indicated, a turn post having duplicate arms, one in receiving position and the other in delivery position, said arms being normally horizontal, a loader in position to load either arm at the loading position thereof, mechanism for angularly erecting either arm in its delivery position, a motor having operative connection with the turn post, in combination with a control circuit including a pair of contacts relatively positioned by the position of the erecting mechanism and a pair of contacts relatively positioned by the position of the loader.

28. In mechanism of the character indicated, a turn post having duplicate arms, one in receiving position and the other in delivery position, said arms being normally horizontal, a loader in position to load either arm at the loading position thereof, mechanism for angularly erecting either arm in its delivery position, a motor having operative connection with the turn post, a second motor having operative connection with the motor and a third motor having operative connection with the erecting mechanism, the motor operating the turn post having a control circuit including a pair of contacts relatively positioned by the position of the erecting mechanism and a pair of contacts relatively positioned by the position of the loader, and each of the other motors having a control circuit containing a pair of contacts positioned by the turn post closed when the turn post is in normal position of rest and open at other positions of the post.

29. In mechanism of the character indicated, a turn post, a plurality of carrier arms angularly spaced from one another on the post each adapted at a receiving position of the arm to receive a plurality of bundles one at a time at an outer end of the arm, means for positioning the post at successive angular positions to successively register the arms at the receiving position and drag mechanism on each arm for pulling received bundles inwardly along the arm.

30. In mechanism of the character indicated, a turn post, a plurality of carrier arms angularly spaced from one another on the post each adapted at a receiving position of the arm to receive a plurality of bundles one at a time at an outer end of the arm, means for positioning the post at successive angular positions to successively register the arms at the receiving position and pneumatically operated drag mechanism on each arm for pulling received bundles inwardly along the arm.

31. In mechanism of the character indicated, a turn post, a plurality of carrier arms angularly spaced from one another on the post each adapted at a receiving position of the arm to receive a plurality of bundles one at a time at an outer end of the arm, means for positioning the post at succesive angular positions to successively register the arms at the receiving position and pneumatically operated drag mechanism on each arm for pulling received bundles inwardly along the arm and including pneumatic pressure connections along the interior of the post.

EDWARD T. PETERSON.